No. 800,102. PATENTED SEPT. 19, 1905.
A. E. HAUSER.
DEVICE FOR TRANSMITTING MOTION.
APPLICATION FILED FEB. 2, 1905.

5 SHEETS—SHEET 1.

WITNESSES:
William Miller
Edward Wiesner

INVENTOR
Arnold E. Hauser
BY
W. C. Hauff
ATTORNEY

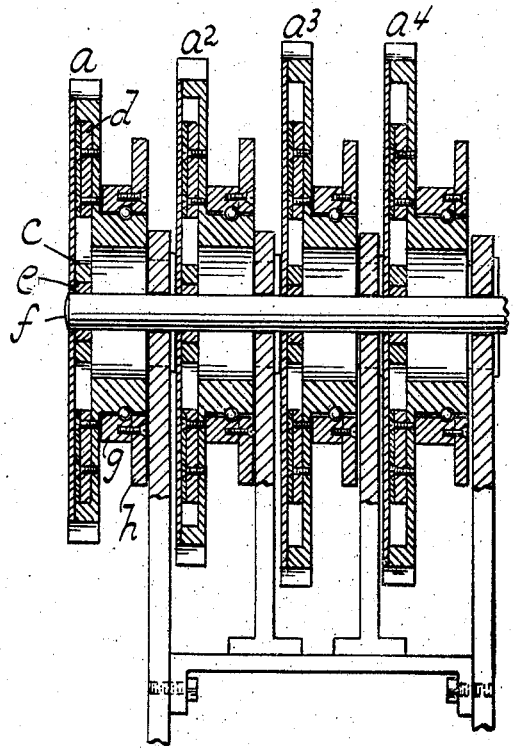
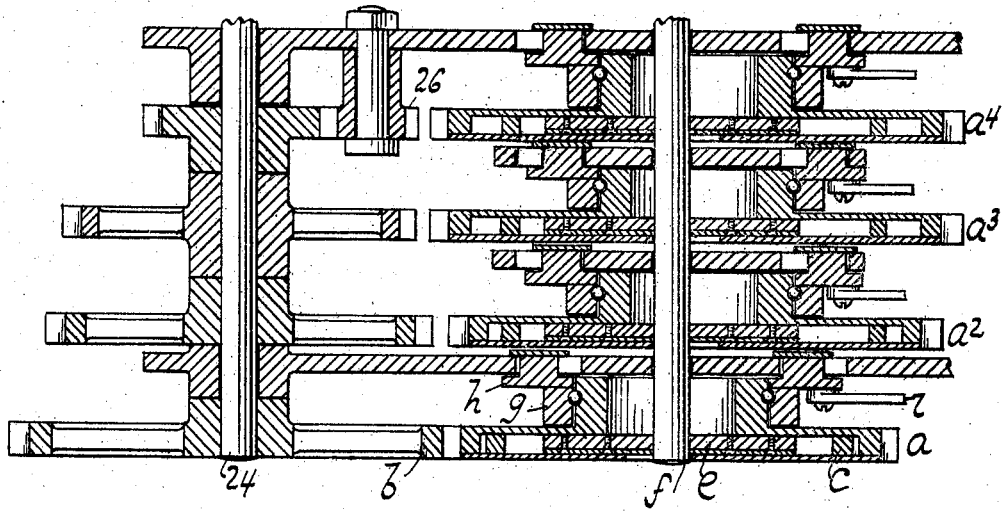

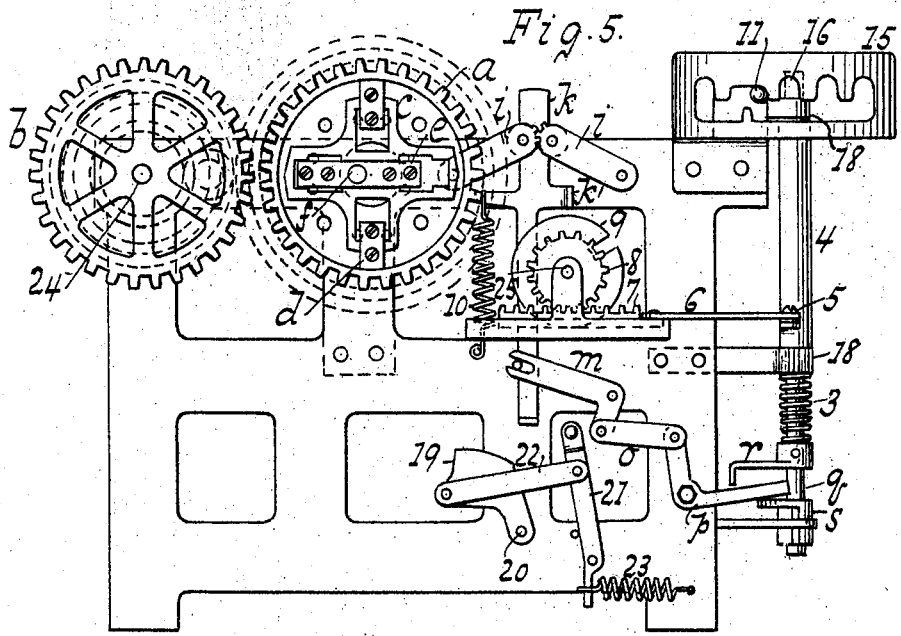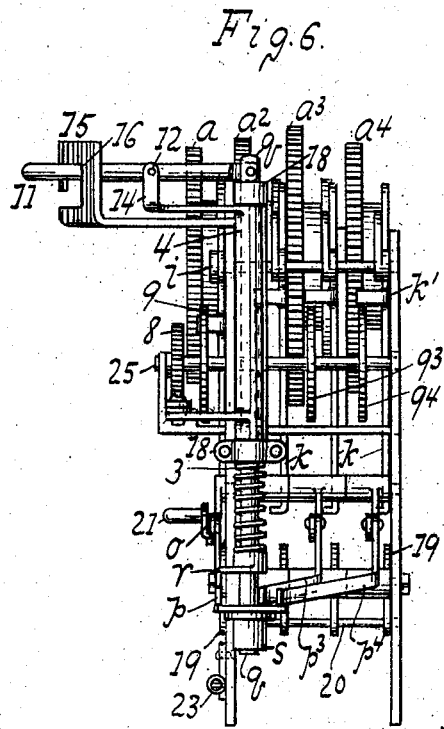

No. 800,102. PATENTED SEPT. 19, 1905.
A. E. HAUSER.
DEVICE FOR TRANSMITTING MOTION.
APPLICATION FILED FEB. 2, 1905.

5 SHEETS—SHEET 4.

WITNESSES:
William Miller
George Hulsberg

INVENTOR
Arnold E. Hauser
BY
W. C. Hauff
ATTORNEY

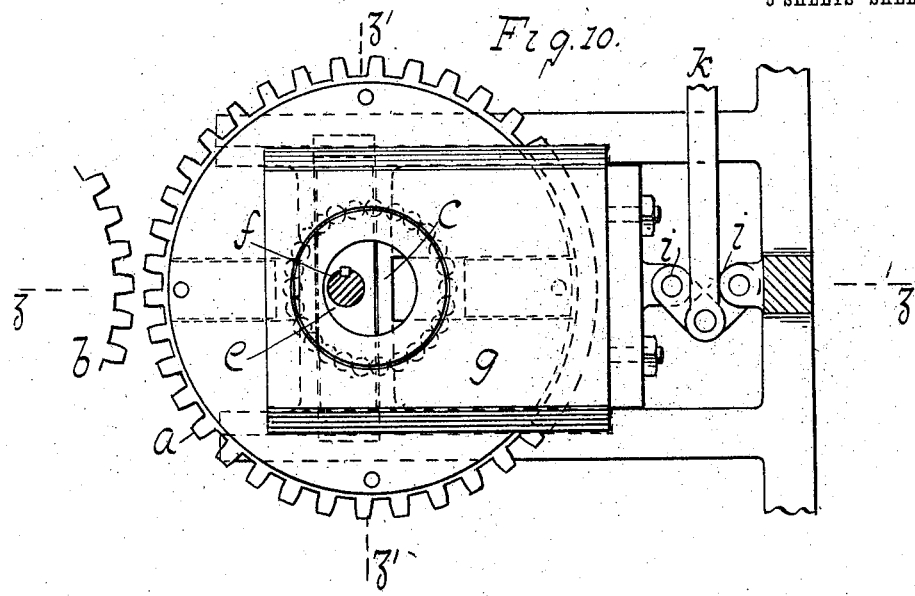
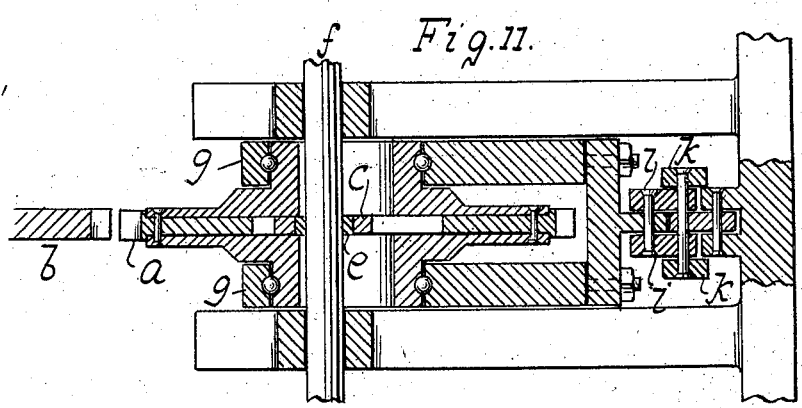
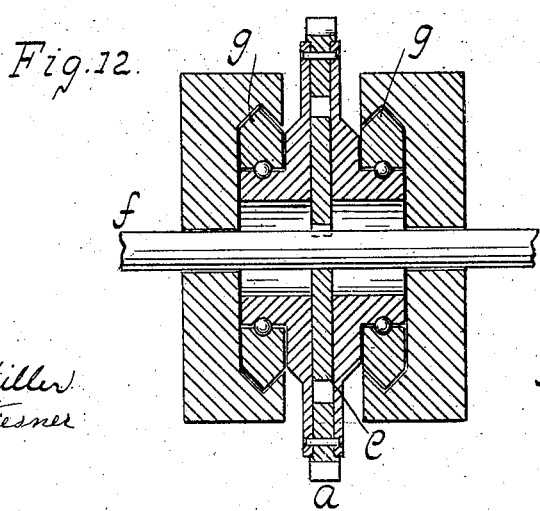

UNITED STATES PATENT OFFICE.

ARNOLD E. HAUSER, OF BROOKLYN, NEW YORK.

DEVICE FOR TRANSMITTING MOTION.

No. 800,102.  Specification of Letters Patent.  Patented Sept. 19, 1905.

Application filed February 2, 1905. Serial No. 243,876.

*To all whom it may concern:*

Be it known that I, ARNOLD E. HAUSER, a citizen of the United States, residing at Brooklyn, in the county of Kings and State of New York, have invented new and useful Improvements in Devices for Transmitting Motion, of which the following is a specification.

This invention relates to certain features of construction set forth in the following specification and claims and illustrated in the annexed drawings, in which—

Figure 1:
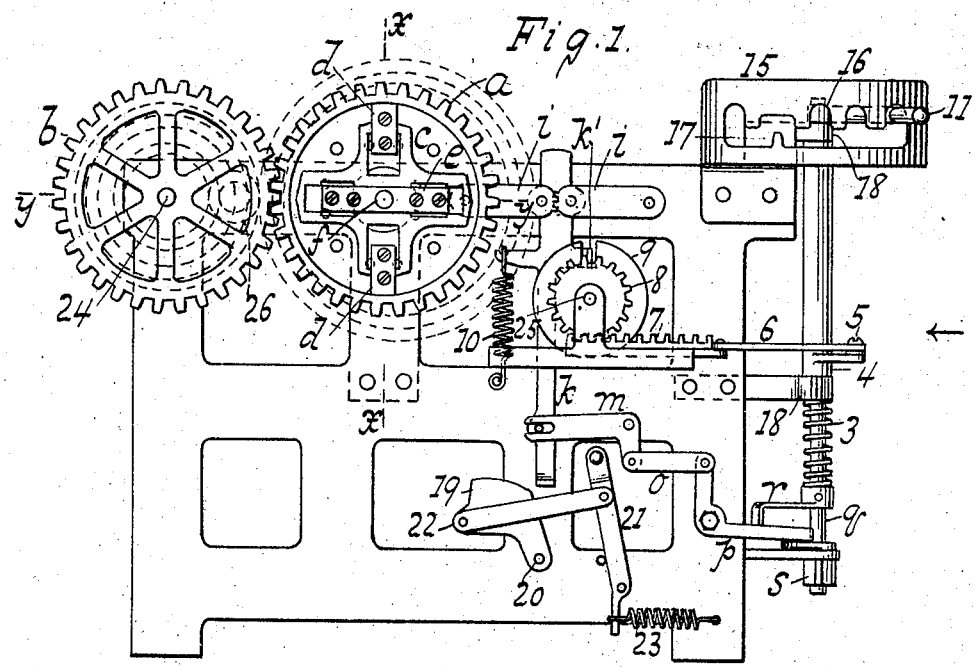
Figure 2:
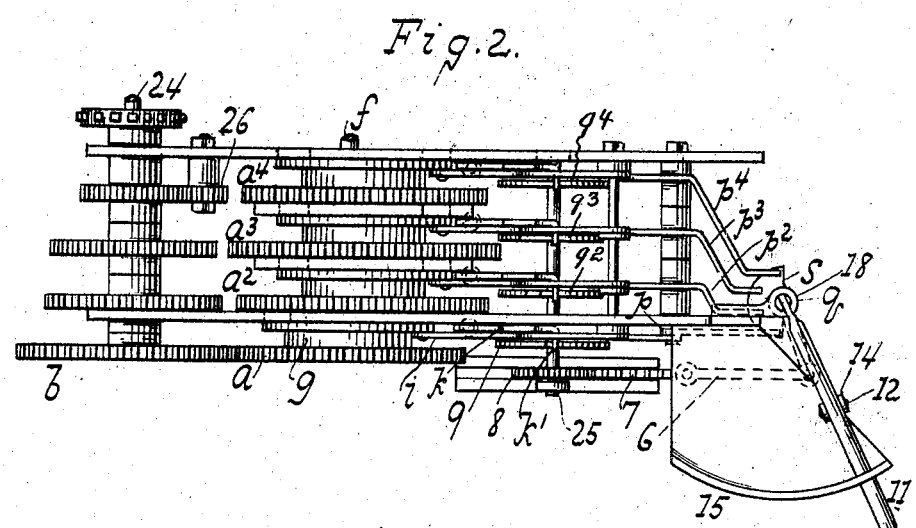
Figure 7:
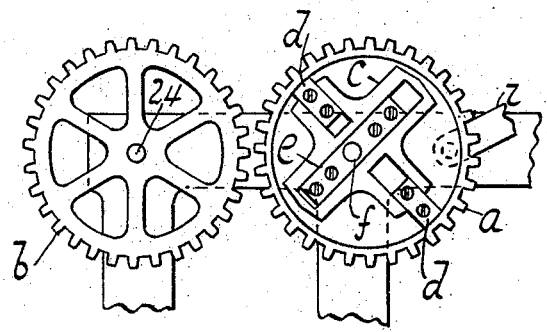
Figure 8:
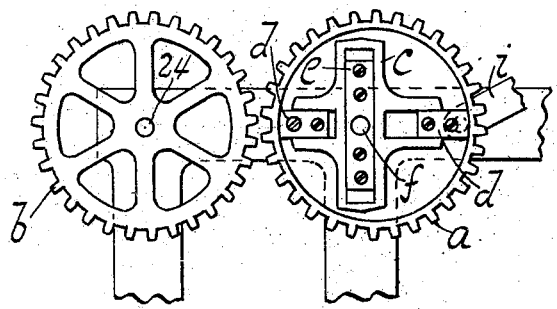
Figure 9:
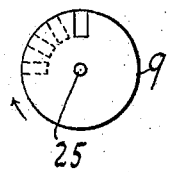

Figure 1 shows a device embodying this invention and with the gear in engaging position. Fig. 2 is a plan view of Fig. 1. Fig. 3 is a section along $xx$, Fig. 1. Fig. 4 is a section along $yy$, Fig. 1. Fig. 5 is a view like Fig. 1, with the gear disengaged or in idle position. Fig. 6 is an edge view of Fig. 5. Figs. 7 and 8 show various positions of a connecting-piece of a gear. Fig. 9 shows mutilated disks superposed with the slots in proper relation. Fig. 10 shows a side elevation of a modification. Fig. 11 is a section along $zz$, Fig. 10. Fig. 12 is a section along $z'z'$, Fig. 10.

In the drawings is shown a wheel or gear $a$, which is shiftable to and from engagement with another wheel $b$, by which it is driven or which can be in its turn driven by the first-named gear. The gear $a$ for convenience of description may at times be referred to as a "driven gear;" but such gear could also be a driving-gear without departing from the invention. This gear is shiftably mounted on what may be called a "connection" or "intermediate" piece $c$. The gear has lugs or blocks $d$, which can be cast with or secured to the wheel. These connecting-lugs $d$ fit or slide in ways or guides of the connecting-piece $c$ or in the forked arms of this connecting-piece. This connecting-piece is shiftable on an arm or cross-piece $e$, keyed or secured to shaft $f$. When the gear $a$ rotates, the rotation is imparted to connection $c$ and shaft $f$, or in case the shaft $f$ rotates its arm $e$ rotates the connection, the wheel $a$ rotating also therewith. The wheel $a$ being shiftable in one direction on piece $c$ and the latter in a transverse or right-angle direction on the shaft or its arm $e$, such wheel $a$ can be readily moved to and from wheel $b$. As the wheel $a$ is shifted in the plane of wheel $b$ and comes to the latter the gears mesh or engage so that the two wheels rotate in unison. A shift in the opposite direction frees or disengages the gears. This shift of gear $a$ eccentrically to shaft $f$ or in a plane of wheels $ab$ is effected by suitable mechanism. The gear $a$ is ring-shaped or has a hub part rotating within a bearing $g$, which can be formed as a ball-race. Such ball-bearing allows the gear $a$ to rotate easily. This bearing $g$ is movable or is part of or forms a carriage or slide. As this carriage is set to or from wheel $b$ the gears are brought to or from engagement. This setting is accomplished by a toggle-joint or links $i$. When the rod $k$ is moved to contract the toggle, the engagement of the gears is broken. When the toggle is straightened, the gears are caused to engage. This rod $k$ is actuated or reciprocated by suitable connections or lever mechanism. A bell-crank lever $m$, connected by link $o$ to lever $p$ and actuated by a rod or shifter $q$, can actuate or set the toggle. The shifter $q$ has an arm $r$. A sleeve $s$ is shown connected to the rod $q$, so as to move longitudinally therewith or rise and fall, but not to turn. The rod $q$ and sleeve $s$ can be connected by a cross-pin, the same as used to hold a wagon-axle or the like in a wheel-hub. When the rod is moved in one direction, the arm $r$ actuates the connections $p$ to $k$ to straighten the toggle or cause engagement of the gears. When the rod is lifted or moved in the opposite direction, the sleeve $s$ moves the lever $p$, so that the toggle is contracted or the engagement of the gears broken.

The rod $q$ is rotary as well as reciprocatory or longitudinally movable. The rotations of the rod will move the arm $r$ to or from alinement or engaging position with the lever $p$. The sleeve $s$, however, is non-rotary and extends about the rod or at least a sufficient extent thereabout to always be in condition to engage the lever $p$ when the rod is lifted. The lifting of the rod will always move the connection to disengage the gears. This sleeve $s$ could be extended entirely about the rod $q$, if desired. The depression of the rod will actuate the connection or engage the gears if arm $r$ is in line or plane to engage lever $p$ and force the same, with the connections, to engaging position.

The rod $q$ slides and rocks and its lower end is steadied in bearing 2—that is, the sleeve-piece $s$ feathers or moves up and down in bearing 2 and is lifted by the rod $q$, which turns in said sleeve $s$. The arm $r$ turns with the rod and is yieldingly connected thereto. A spring or yielding connection is shown at 3. In case the gears $a$ $b$ should come together with teeth abutting instead of meshing this yielding connection prevents strain or breakage, but exerts sufficient force to cause arm $r$ to actuate the connections and bring the gears to engagement as soon as possible.

The rod $q$ turns with a tube or hollow shaft 4, but moves longitudinally independent thereof. The rod $q$, so to say, "feathers" in the tube 4. This tube 4 by crank arm or pin 5 actuates link 6 with rack 7 and gear 8 to turn a mutilated disk 9. When the cut or mutilation in the disk is brought to register with arm or shoulder $k'$ of toggle-rod $k$, this rod can sink or move to position to straighten the toggle or effect engagement of the gears. A spring 10 is applied to move the toggle to engaging position. When the arm $k'$ is raised and rests on a full part of the mutilated disk, the toggle is held in bent or retracted position, the gears being kept out of engagement.

The rod $q$ can be actuated by a lever or handle 11, fulcrumed at 12 on a bracket or arm 14, extending from tube 4. When the lever is actuated about its fulcrum, the rod $q$ is moved longitudinally in the tube 4. When the lever is swung from side to side or rotated about the axis of rod $q$, then said rod with tube 4 rotate together. The lever in swinging moves in a guide-piece or slotted curved plate 15. When the lever is moved to the offset or shoulder part 16 of said guide 15 and released, said lever comes to rest in this offset or cut 16, the mutilation of disk 9 allowing the rod $k$ to sink or enter the disk and the toggle to straighten, so that the gears come into engagement. When the lever-handle is depressed out of the offset 16, the rod $q$ is raised and the levers $p$ and $m$ actuated to raise the rod $k$ and bend or retract the toggle $i$ to disengage the gears. On swinging the lever to a stop 17 the rod $q$ with tube 4 and arm 5 are turned, and rack 7 rotates disk 9 to bring a high part of the latter to arm $k'$ of rod $k$. When the lever-handle is now released, the rod $q$ sinks back to place, but arm $k'$, resting on a high part of disk 9, keeps the toggle retracted or in disengaging position. As the tube 4 rotates easily in the bearings 18, the handle can be readily swung to any desired point of the arc 15.

In case the gear is rapidly to be thrown out of action, as in case of an emergency, the cam or lifter 19 can be swung about pivot 20 by the pedal 21 and link 22. A returning-spring 23 can be provided for the pedal. When the cam is moved under rod $k$, the latter is raised to contract the links or toggle and move the gear out of engagement.

In the drawings is shown a driving means or actuator, such as a pinion or crank, applied to shaft 24; but, as stated, the shaft $f$ could be driven or have power applied thereto and gear $a$ made to transmit motion to gear $b$ instead of receiving motion therefrom. In addition to gear $a$ are shown gears $a^2$, $a^3$, and $a^4$. On the shaft 25 of multilated disk 9 are also mounted multilated disks $9^2$, $9^3$, and $9^4$. When the cut of disk 9 is in the position shown in Figs. 1 and 9, the toggle $i$ of the gear $a$ is allowed to straighten, and this gear then engages. The multilations of the other disks, however, as seen in Fig. 9, are out of register with their respective toggle lifters or rods, and each such toggle is bent or holds its gear $a^2$ $a^3$ $a^4$ out of engagement or in idle position. If the shaft 25 is turned to bring the cut of disk 9 out of register with its toggle and the cut of another of the disks $9^2$ to $9^4$ into register with a toggle-rod, the respective one of the gears $a^2$ to $a^4$ comes into engagement.

The various toggles are actuated as the toggle $i$ is actuated by its lever or connection $p$. The various connections $p^2$, $p^3$, and $p^4$ can each be actuated in its turn as the arm $r$ of rod $q$ is made to bear onto one or another of such connections or bell-crank levers.

The gears $a$ $a^2$ $a^3$ are shown of various sizes, so that varying speeds can be obtained by shifting one or another of these gears into action.

The gear $a^4$ is shown as a reversing-gear, as it engages an intermediate gear 26, Figs. 2 and 4, which latter causes shaft 24 to be turned in reverse direction.

The arc-piece 15 has various stops or locks like the one shown at 16, each stop holding the lever 11 in position for a gear to be held in action. The stop 17 might be called a "neutral" stop, as when lever 11 strikes this neutral stop all gears are idle. If the lever is swung to one side—say the left in Fig. 1 of the neutral stop—the reverse gear is put in mesh. A movement of the lever to the other side of the neutral stop will cause engagement of one of the gears $a$ to $a^3$. As the lever can be rapidly moved from any position to the neutral stop, the gears can all be rapidly put out of action.

The connections $c$ and $e$ allow the gear $a$ to be readily shifted no matter whether in the position shown in Fig. 1 with the arm $e$ in horizontal or whether in vertical, as in Fig. 8, or intermediate positions, as in Fig. 7.

Ball-bearings or rollers can be applied between the parts $c$, $d$, and $e$.

When one disk is in engaging position, the other disks are out of position, as seen, for example, in Fig. 9, where disk 9 is shown in engaging position, and the disks $9^2$, $9^3$, and $9^4$ are all out of engaging position.

The mechanism can be applied to automobiles and other devices where application of power or variations of speed are called for. Of course this invention is not confined to the exact construction shown, as variations embodying the above principle of construction are possible. For example, only one gear, as

*a*, can be employed, or a different number of gears, as four or more or less, can be applied as called for. The shaft *f* or 24 might either one be arranged to receive power or to transmit power, as such shaft is the driving or driven shaft.

The device thus far described was found to operate satisfactorily, but for heavier work or when exposed to strain it is advisable to have the wheel *a* supported not only on one side, but on both.

In Figs. 10 and 12 is shown provision for more rigid construction. The wheel *a* instead of having a bearing *g* on only one side can have a bearing at each side, as seen in Figs. 11 and 12. The toggle *i* can also be made of two pairs of links instead of one to secure an even pull or sliding movement without binding. The connections for shifting, however, remain the same. No change of principle is involved in duplicating certain parts, such as the bearings.

What I claim as my invention, and desire to secure by Letters Patent, is—

1. A gear, a connection or intermediate piece on which the gear is shiftably mounted, means for shifting the gear and a shaft on which the connection is shiftably mounted.

2. A shaft having an arm keyed or fixed thereto, a connection or intermediate piece shiftable on said arm, a gear shiftable on the intermediate piece, and a shifting link for the gear.

3. A gear, a shiftable bearing for the gear a connection or intermediate piece made to rotate with the gear, and a shaft made to rotate with the intermediate piece, said gear with its bearing and intermediate piece being shiftable eccentrically with respect to the shaft.

4. A shaft with a cross-arm, a connecting-piece shiftably mounted on the arm, a gear-wheel shiftable on the connecting-piece in a direction transverse to the direction of shift of said piece, a shiftable bearing for the gear-wheel, and a shifting link connected to the bearing.

5. A series of motor-gears, a series of transmission-gears shiftable to and from the motor-gears in the planes of the latter, a non-shiftable rotary shaft connected to the transmission-gears so that the latter and the shaft all rotate together, and mechanism for shifting the transmission-gears.

6. A motor-gear and a transmission-gear placed in a common plane, a non-shiftable rotary shaft having a permanent connection with the transmission-gear so that the shaft and transmission-gear are at all times in engagement to rotate together, and mechanism for shifting the transmission-gear in said plane to and from the other gear.

7. A motor-gear, a transmission-gear, a shiftable support or carrier for one of the gears, a toggle or links for actuating the support and an actuating-rod for the toggle.

8. A motor-gear, a transmission-gear, a toggle or links for shifting one of the gears, an actuating-rod for the toggle, a link and bell-crank levers for the rod, and a hand-actuated rod for one of the bell-crank levers.

9. A set of shiftable gears, a non-shiftable shaft for the gears, links for shifting the gears respectively in their planes into engagement, and a setting-arm for actuating the shifting mechanism, said arm being rotary so as to be movable to the shifting mechanisms of the various gears.

10. A set of gears respectively shiftable to and from engaging position, a shifting toggle and a link for each gear, individual bell-crank levers linked together for each shifting toggle, and means for individually actuating the bell-crank levers for each gear.

11. A gear and actuating means therefor, combined with a bell-crank lever and shiftable-gear bearing to which the lever is connected for shifting the gear, a lifter or rod having a portion for engaging the bell-crank lever, and an actuating-handle for the rod.

12. A gear and shifting lever therefor, means for connecting the lever and gear, a rod having a sleeve and arm for moving the lever in opposite directions, and a lever-handle for moving the rod to shift the lever and for rotating the rod to move the arm out of engagement with the lever.

13. A gear and shifting lever therefor, means for connecting the lever and gear, a longitudinally-movable and rotary rod made to engage the lever, a handle for actuating the rod, and a sleeve or hollow shaft through which the rod extends and on which the handle is mounted or fulcrumed.

14. A shiftable gear combined with a shifter-rod and an actuating-lever therefor, a fulcrum for the lever, a tube surrounding the rod and supporting the fulcrum, an arm carried by the rod, and a gear-shifting connection engaging the shiftable gear and engaged by the arm, said rod and tube being rotatable together to enable the arm to be moved to and from engaging position and the rod being movable or feathering in the tube to cause the arm to actuate the shifting connection.

15. A shiftable gear combined with a shifter-rod, a rotary hollow shaft or tube on which the rod is feathered, a lever for the rod fulcrumed on the tube, an arm carried by the rod, and gear-shifting connections engaging the shiftable gear and engaged by the arm, said rod being rotary with the tube and fulcrum to maintain engagement of the latter with its lever and to bring the arm to and from engaging position.

16. A set of shiftable gears, shifting connections engaging the gears, a shifting rod with arm adjustable to the respective shifting connections, an actuating-lever for the rod, and guides or locks for the lever in its various positions.

17. A shiftable gear, shifting connections engaging the gear, a shifting rod with arm for the connections, a lever for the rod, a guide with lock portions for the lever and a stop for arresting the lever when the arm has been moved out of action.

18. The combination with shiftable gears of shifting connections engaging the several gears, a shifting rod with an arm adapted to be moved to engaging position for the several connections, a lever for moving the rod and arm to the various engaging positions, and an intermediate stop for the lever.

19. A shiftable gear, a toggle-joint for shifting the gear, a bell-crank lever for actuating the toggle-joint, means for connecting the lever and toggle-joint a rod with a shoulder and arm for actuating the bell-crank lever and the toggle-joint in opposite directions, and a handle for the rod.

20. A shiftable gear, mechanism for shifting the gear, and a mutilated disk for the shifting mechanism to hold the gear in position, the high or unmutilated part of said disk being made to hold the gear retracted or out of action.

21. A shiftable gear, mechanism for shifting the gear, a mutilated disk with rack and gear for the same, and means for simultaneously actuating the shifting mechanism and the rack so as to bring the mutilated gear to position for holding the gear disengaged.

22. A shiftable gear, a toggle-joint with actuating rod and levers for shifting the gear, said rod having a detent portion, a disk for engaging the detent portion, a rack and gear for the disk, and a shifter-rod for actuating the toggle-actuating lever and the rack.

23. A shiftable gear, shifting mechanism for the gear, a detent mechanism for the shifting mechanism, and an actuating-rod having arms for the shifting and detent mechanism.

24. A shiftable gear, shifting mechanism for the gear, a detent mechanism for the shifting mechanism, and a rotary and longitudinally-movable rod having laterally-extended arms one of which by the rotation of the rod is made to actuate or set the detent, and the other of which by said rotation is carried to engaging position with the shifting mechanism and by the longitudinal movement is made to actuate such shifting mechanism.

25. A shiftable gear, links and levers for shifting the gear, a detent-disk for one of the links, a gear and rack for setting the disk, a swinging arm for the disk-setting rack, and a swinging and reciprocating arm adapted to be swung to engagement with a shifting lever and to be reciprocated to actuate the same, said shifting links and levers being made to connect the swinging and reciprocating arm with the shiftable gear, and the gear and rack being made to connect the swinging arm and disk-setting gear.

26. A shiftable gear combined with a shifting mechanism comprising a rotary and reciprocating rod, an arm carried by the rod and adapted to be swung thereby to and from engagement with the shifting mechanism and to actuate the same when reciprocated, a non-reciprocating tube or hollow shaft made to rotate with the rod, an arm carried by the tube, and a detent actuated by said arm.

27. A shiftable gear, a toggle-joint for shifting the gear, a rod for actuating the toggle-joint and having a detent-arm, a mutilated disk into which the arm is made to enter to allow the toggle-joint to be extended and on the circumference of which the arm is made to rest to hold the toggle-joint contracted, and means for actuating the toggle-rod and the disk.

28. A series of shiftable gears, a toggle-joint for each gear, and a set of mutilated disks, each toggle-joint having an arm adapted to rest on its respective disk for holding the toggle-joint in retracting position.

29. A series of shiftable gears, a toggle-joint for each gear, a lifter-rod having a shoulder or engaging portion common to all said toggle-joints for freeing the gears and an arm on said rod adapted to engage but one of said toggle-joints at any one time to bring such gear into engaging position.

30. A shiftable gear, a toggle for shifting the gear, links and levers for actuating the toggle a mutilated disk adapted to hold the toggle in retracted position, a rack and gear for actuating the disk, a tubular shaft for actuating the rack, a rod for actuating the shifting links and levers and extended through the tubular shaft, and a lever-handle for the rod fulcrumed on the tubular shaft.

31. A shiftable gear and shifting levers therefor, a mutilated disk for holding the gear when shifted, a rod for actuating the shifting levers, a rotary shaft for actuating the mutilated disk, a bracket carried by the rotary shaft, and a lever-handle fulcrumed on the bracket and made to rotate the shaft and rod and to reciprocate the rod.

32. A shiftable gear, a toggle and rod for shifting the gear, actuating-levers for the toggle, and a pedal for moving or lifting the rod.

33. A set of shiftable gears with individual shifting toggles connected to the gears, rods connected to the toggles and a pedal common to all of said toggles and made to engage the rods.

34. A set of shiftable gears, a shifting toggle for each individual gear, rods connected to the toggles, mutilated disks for allowing one of the toggles to move its gear into engagement while holding the others in disengaging position, and a releasing-pedal common to all said toggles.

35. A shiftable gear with shifting toggle or links and actuating means for the links, a mutilated disk for the gear, a rod and lever for the actuating means, and a rotary tube with actuating means for the mutilated disk and in which tube the rod is movable, said lever being fulcrumed on the tube and made to rotate the tube and rod together and to move the rod longitudinally independently of the tube.

36. A shiftable gear, a shaft loosely surrounded by the gear to leave the latter eccentrically movable with respect to the shaft, means located clear of the shaft for shifting the gear on the shaft, and means for holding the gear in shifted position.

In testimony whereof I have hereunto set my hand in the presence of two subscribing witnesses.

ARNOLD E. HAUSER.

Witnesses:
W. C. HAUFF,
EDWARD WIESNER.